(12) United States Patent
Visharam et al.

(10) Patent No.: US 7,831,990 B2
(45) Date of Patent: Nov. 9, 2010

(54) GENERIC ADAPTATION LAYER FOR JVT VIDEO

(75) Inventors: Mohammed Zubair Visharam, Santa Clara, CA (US); Ali Tabatabai, Cupertino, CA (US); Toby Walker, Seattle, WA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2263 days.

(21) Appl. No.: 10/425,291

(22) Filed: Apr. 28, 2003

(65) Prior Publication Data

US 2004/0010802 A1 Jan. 15, 2004

Related U.S. Application Data

(60) Provisional application No. 60/376,473, filed on Apr. 29, 2002.

(51) Int. Cl.
*H04N 7/173* (2006.01)
(52) U.S. Cl. .................. 725/95; 725/118; 725/148; 375/240.23; 375/240.24; 382/246; 382/235
(58) Field of Classification Search .................. 725/95, 725/118, 148; 375/240.23, 240.24; 382/246, 382/235
See application file for complete search history.

(56) References Cited

U.S. PATENT DOCUMENTS

| | | | |
|---|---|---|---|
| 5,754,700 A | 5/1998 | Kuzma | |
| 5,802,063 A | 9/1998 | Deiss | |
| 5,832,472 A | 11/1998 | Sheppard, II | |
| 5,864,682 A | 1/1999 | Porter et al. | |
| 6,044,397 A | 3/2000 | Eleftheriadis et al. | |
| 6,079,566 A | 6/2000 | Eleftheriadis et al. | |
| 6,092,107 A | 7/2000 | Eleftheriadis et al. | |
| 6,134,243 A | 10/2000 | Jones et al. | |
| 6,181,822 B1 | 1/2001 | Miller et al. | |
| 6,192,083 B1 | 2/2001 | Linzer et al. | |
| 6,215,746 B1 | 4/2001 | Ando et al. | |
| 6,292,805 B1 | 9/2001 | Basso et al. | |
| 6,317,462 B1 | 11/2001 | Boyce | |
| 6,327,304 B1 | 12/2001 | Miller et al. | |
| 6,353,703 B1 | 3/2002 | Tatsumi et al. | |
| 6,370,116 B1 | 4/2002 | Giroux et al. | |
| 6,400,996 B1 | 6/2002 | Hoffberg et al. | |
| 6,426,778 B1 | 7/2002 | Valdez, Jr. | |
| 6,453,355 B1 | 9/2002 | Jones et al. | |
| 6,546,195 B2 | 4/2003 | Kashiwagi et al. | |
| 6,574,378 B1 | 6/2003 | Lim | |

(Continued)

OTHER PUBLICATIONS

PCT Search Report dated Nov. 25, 2003, 5 pages.

(Continued)

*Primary Examiner*—Shawn An
(74) *Attorney, Agent, or Firm*—Blakely, Sokoloff, Taylor & Zafman LLP

(57) ABSTRACT

An encoding system includes a video coding layer (VCL) to generate slices when encoding multimedia data, a generic adaptation layer (GAL) to create, from the slices, a set of GAL units having a format that is generic to various transport systems, and a network adaptation layer (NAL) associated with a specific transport system to map the set of GAL units to the format of the specific transport system.

35 Claims, 11 Drawing Sheets

U.S. PATENT DOCUMENTS

| | | | |
|---|---|---|---|
| 6,920,175 | B2 | 7/2005 | Kaczewicz et al. |
| 6,937,770 | B1 | 8/2005 | Oguz et al. |
| 7,724,818 | B2 * | 5/2010 | Hannuksela et al. ... 375/240.01 |
| 7,742,524 | B2 * | 6/2010 | Jeon et al. ............ 375/240.13 |
| 2004/0006745 | A1 | 1/2004 | van Helden et al. |
| 2004/0024898 | A1 | 2/2004 | Wan |
| 2004/0123327 | A1 | 6/2004 | Fai Ma et al. |
| 2004/0143786 | A1 | 7/2004 | Stauder et al. |
| 2004/0179605 | A1 | 9/2004 | Lane |
| 2004/0207755 | A1 | 10/2004 | Lin |
| 2005/0101245 | A1 * | 5/2005 | Ahmavaara ................ 455/1 |
| 2005/0232284 | A1 | 10/2005 | Karaoguz et al. |

OTHER PUBLICATIONS

Marta Karczewicz, A Proposal for SP-Frames, ITU-Telecommunications Standardization Sector, Study Group, Jan. 1, 2001, pp. 1-9.

Singer, Belknap, Franceschini, Amendment 6: MP4, the MPEG-4 File Format, Dec. 7, 2001, Apple Computer Inc., IBM Corporation, CSELT.

Wenger, Stockhammer, J.26L over IP and H.324 Framework, Sep. 18, 2001.

Wenger, Cote, Gallant, Proposed Draft of Modified Annex L Including Copyright, Normative Error Concealment, and Exact IDCT Signaling, Oct. 22, 1999.

Wiegand, Joint Model No. 1, Revision 1(JM-1r1), Jan. 18, 2002.

DVD Demystified, Home of the DVD FAQ, http:www.dvddemystified.com/glossary.html, pp. 1-33.

Hannuksela, M., "H.26L File Format," ITU Telecommunications Standardization Sector VCEG-044, Nov. 28, 2001, 20 pages.

Hannuksela, M., "Enhanced Concept of GOP," ISO/IEC JTC1/SC29/WG11 and ITU SG16 Q.6, Jan. 23, 2002, 13 pages.

Singer, D., et al., "ISO Media File Format Specification" ISO/IEC/JTC1/SC29/WG11 (N4270-1), Jul. 23, 2001, 49 pages.

Singer, D., et al., "Amendment 6: MP4, The MPEG File Format," ISO/IEC/JTC1/SC29/WG11 MPEG01/N4420, Dec. 27, 2001, 12 pages.

Stockhammer, T., et al., "Comments on H.26L NAL Design," ITU-Telecommunications Standardization Sector, Study Group 16, Question 6, Video Coding Experts Group (VCEG), Printed May 22, 2003, 4 pages.

Stockhammer, T., et al., "H.26L/JVT Coding Network Abstraction Layer And IP-Based Transport," IEEE 2002 International Conference on Image Processing, Rochester New York, Sep. 22-25, 2002, Available: http://www.lnt.e-technik.tu-muenchen.de/mitarbeiter/stockhammer/publications/icip2002_5.pdf, 4 pages.

Walker, T., et al., "First Ideas On The Storage of AVC Content in MP4," International Standard ISO/IEC, May 2002, pp. 4-39.

Walker, T., et al., "Generic Adaptation Layer for JVT Video," Joint Video Team (AVC) of ISO/IEC MPEG & ITU-T VCEG, (ISO/IEC JTC1/SC29/WG11 and ITU-T SG16, Q6), 3rd Meeting, Fairfax, VA May 6-10, 2002, 23 pages.

Wenger, S., et al., "H.26L Over IP and H.324 Framework," ITU Telecommunications Standardization Sector VCEG-N52, Sep. 18, 2001, 13 pages.

Wenger, S., et al., "RTP Payload Format for JVT Video," Retrieved from http://www.cs.columbia.edu/{hgs/rtp/drafts/draft-wenger-avt-rtp-jvt-00.t>, Feb. 21, 2002, 13 pages.

Wiegand, T., "Joint Model No. 1, Revision 1(JM-IRL)," ITU Study Group 16-Video Coding Experts Group, Dec. 3, 2001, pp. 1 and 3-75.

PCT Search Report PCT/US03/05630 dated Jul. 10, 2003, 8 pages.
PCT Search Report PCT/US03/05636 dated Jul. 10, 2003, 7 pages.
PCT Search Report PCT/US03/05633 dated Jul. 10, 2003, 7 pages.
PCT Search Report PCT/US03/05634 dated Jul. 10, 2003, 7 pages.
PCT Search Report PCT/US03/13145 dated Jul. 22, 2003, 5 pages.

* cited by examiner

US 7,831,990 B2

GENERIC ADAPTATION LAYER FOR JVT VIDEO

RELATED APPLICATIONS

This application is related to and claims the benefit of U.S. Provisional Patent application Ser. No. 60/376,473 filed Apr. 29, 2002, which is hereby incorporated by reference.

FIELD OF THE INVENTION

The invention relates generally to the coding of multimedia data and particularly to providing a generic adaptation layer for the coded multimedia data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Sony Electronics, Inc., All Rights Reserved.

BACKGROUND OF THE INVENTION

In the wake of rapidly increasing demand for network, multimedia, database and other digital capacity, many multimedia-coding schemes have evolved. Recently, the Moving Picture Experts Group (MPEG) and the Video Coding Experts Group (VCEG) of International Telecommunication Union (ITU) began working together as a Joint Video Team (JVT) to develop a new video coding/decoding (codec) standard referred to as ITU Recommendation H.264 or MPEG-4-Part 10, Advanced Video Codec (AVC) or JVT codec.

The JVT codec design distinguishes between two different conceptual layers, the Video Coding Layer (VCL) and the Network Abstraction Layer (NAL). The VCL contains the coding related parts of the codec, such as motion compensation, transform coding of coefficients, and entropy coding. The output of the VCL is slices, each of which contains a series of macroblocks and associated header information. The NAL packages the VCL data for transport on a system layer. Each system layer requires a specific syntax. For example, Real-Time Transport Protocol (RTP) systems require a packet oriented syntax, MPEG-2 systems require a byte-stream syntax, and transport systems using specific file formats (e.g., MP4 file format) require that the VCL data be structured according to these file formats. Hence, the NAL must be either specific to a particular transport system or store a large volume of information to be able to package the VCL data into various formats. While the former approach allows for greater optimization, it hinders interoperability. Conversely, the latter approach affects performance and limits the NAL's operation to existing transport systems.

SUMMARY OF THE INVENTION

An encoding system includes a video coding layer (VCL) to generate slices when encoding multimedia data, a generic adaptation layer (GAL) to create, from the slices, a set of GAL units having a format that is generic to various transport systems, and a network adaptation layer (NAL) associated with a specific transport system to map the set of GAL units to the format of the specific transport system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
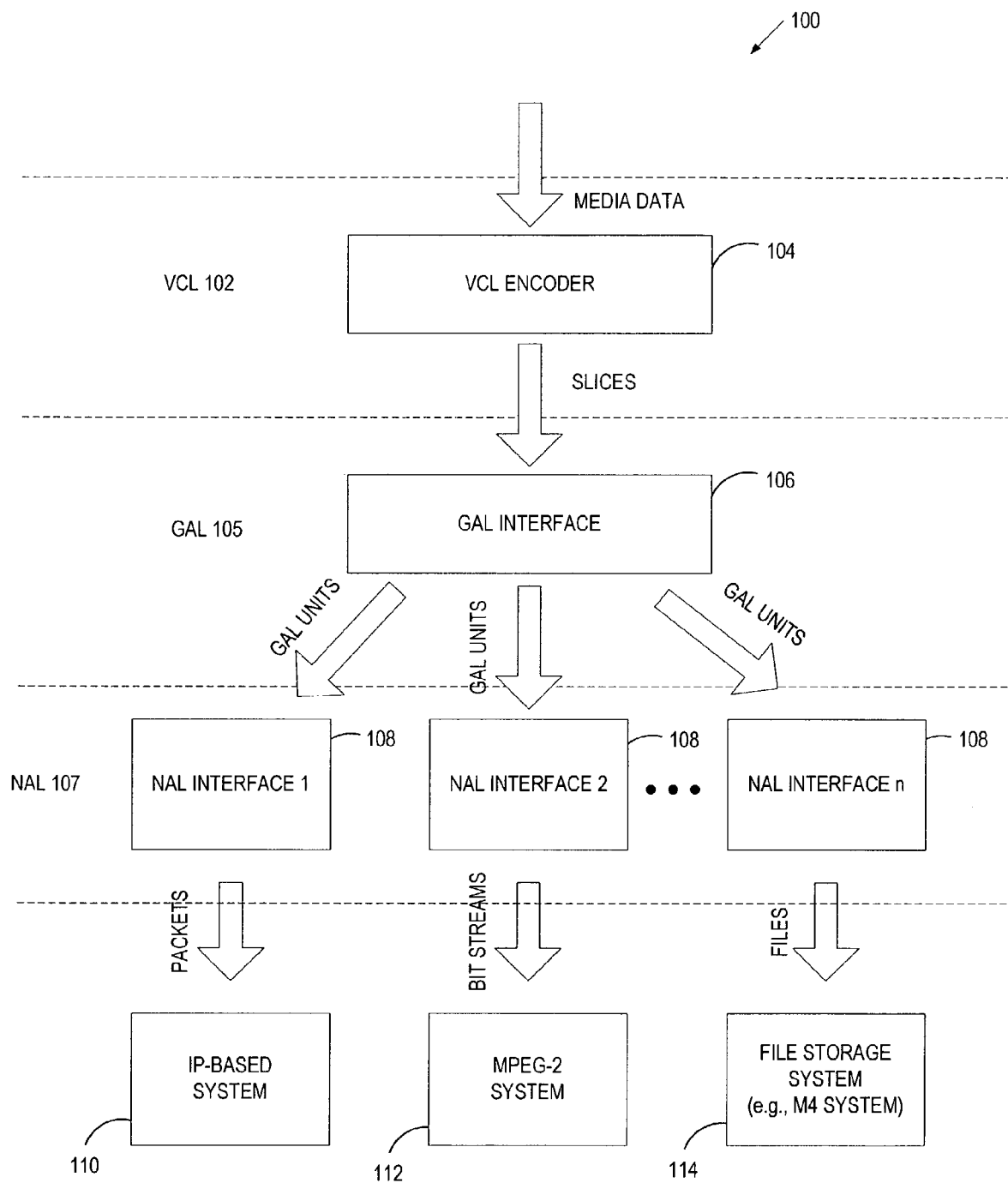
FIG. 1 is a block diagram of one embodiment of an encoding system.

Beginning with an overview of the operation of the invention, FIG. 1 illustrates one embodiment of an encoding system 100. The encoding system 100 includes conceptually three layers: a video coding layer (VCL) 102, a generic adaptation layer (GAL) 105, and a network adaptation layer (NAL) 107.

At the video coding layer 102, a VCL encoder 104 receives media data that may include video data (e.g., video objects created from a natural source video scene and other external video objects), audio data (e.g., audio objects created from a natural source audio scene and other external audio objects), synthetic objects, or any combination of the above. The media encoder 104 may consist of a number of individual encoders or include sub-encoders to process various types of media data. The media encoder 104 codes the media data and creates multiple slices, each of which contains a series of macroblocks and associated header information.

At the generic adaptation layer 105, a GAL interface 106 receives slices from the VCL encoder 104 and creates a set of GAL units that have a NAL-independent format. That is, GAL units include enough information to allow a NAL of any transport system type to package data according to the syntax required by a corresponding transport system. As will be discussed in more detail below, the GAL units may include structural units that provide information about the structure of the media data, media data units that include the media data coded by the VCL encoder 104, and parameter set units that include parameter sets associated with the media data. A parameter set defines a group of parameter values that control the decoding of the VCL data. In one embodiment, the GAL units also include supplemental enhanced information (SEI) message units that include SEI messages associated with the media data. An SEI message contains auxiliary information about the media data.

The GAL interface 106 may be implemented in software, hardware, or a combination of both. In one embodiment, the GAL interface 106 is part of the VCL encoder 104. Alternatively, the GAL interface 106 is an independent module that communicates with the VCL encoder 104 directly or via a public network (e.g., Internet) or private network (e.g., LAN).

At the network adaptation layer 107, NAL interfaces 108 of specific transport system types receive GAL units from the GAL interface 106 and package them according to syntax of these transport system types. Each NAL interface 108 may communicate with the GAL interface 106 directly or via a private or public network. NAL interfaces 108 may be implemented in software, hardware, or a combination of both. Examples of transport systems types may include an Internet Protocol (IP) transport system 110 (e.g., a Real-Time Transport Protocol over IP (RTP/IP) system) that requires a packet oriented syntax, an MPEG-2 system 112 that requires a bitstream syntax, a file storage system 114 that requires a specific file format (e.g., the MP4 file format), etc.

In one embodiment, a NAL interface 108 uses multiple channels to carry the content. For example, the NAL interface 108 may carry the media data in a first stream, parameter sets associated with this media data in a second stream, and SEI messages associated with this media data in a third stream. In another embodiment, a NAL interface carries the content inside a single channel. In one embodiment, each type of NAL interface 108 is associated with a predefined specification (referred to herein as a NAL descriptor) that specifies one or more channels used by this type of NAL interface and defines characteristics of each channel.

Figure 2:
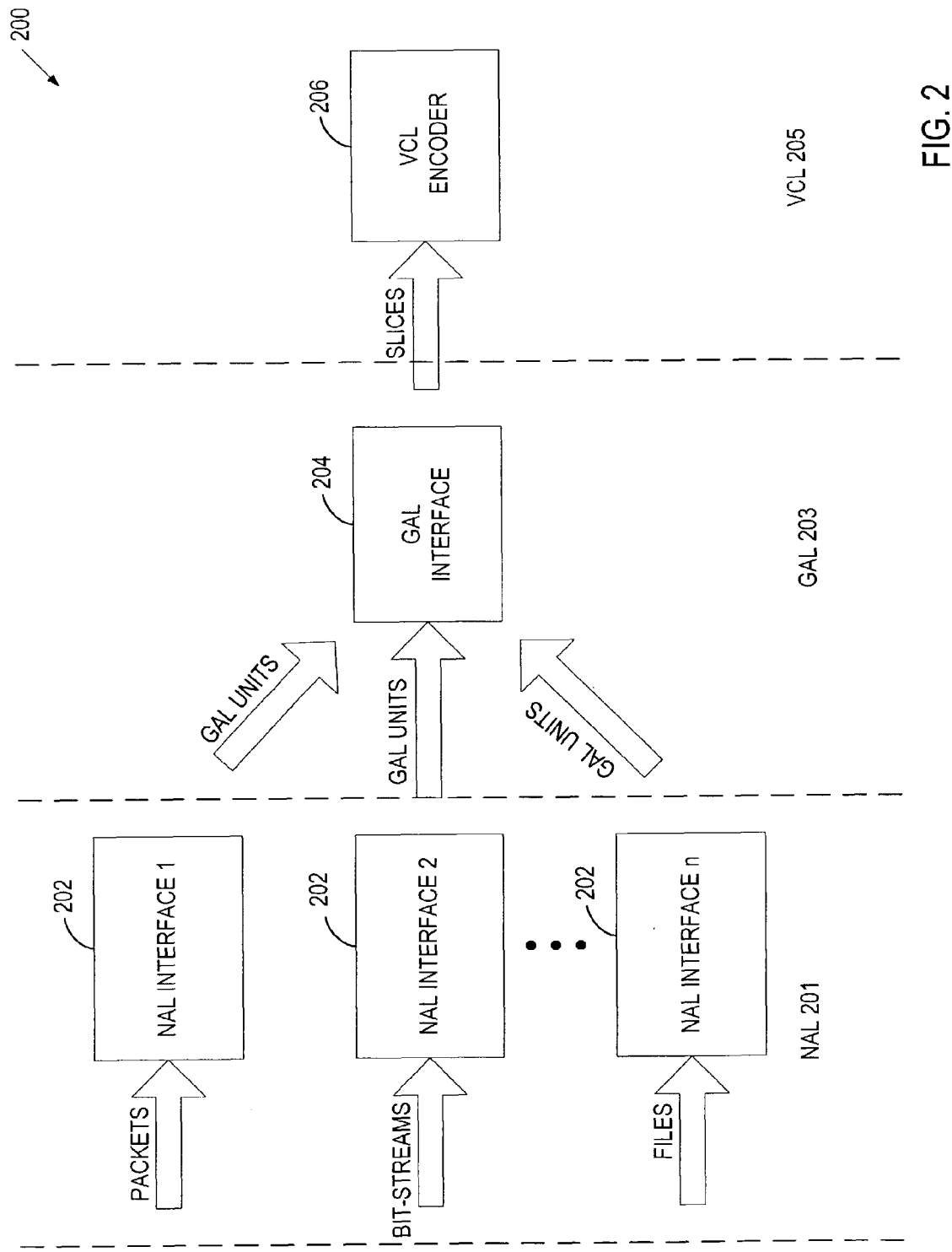
FIG. 2 is a block diagram of one embodiment of a decoding system.

FIG. 2 illustrates one embodiment of a decoding system 200. The decoding system 200 conceptually includes three layers operating in the reverse order as compared to the encoding system 100: a network adaptation layer 201, a generic adaptation layer 203, and a video coding layer 205.

At the network adaptation layer 201, NAL interfaces 202 receive data from various transport systems, such as IP systems, MPEG-2 systems, file storage systems (e.g., MP4 systems), etc., and transform it into GAL units. In one embodiment, the transformation is performed based on the reverse mapping specified by a descriptor of a specific NAL interface 202.

Further, at the generic adaptation layer 203, a GAL interface 204 extracts slices from the GAL units and sends them to a VCL decoder 206 operating at the video coding layer 205 to decode the content.

Figure 3:
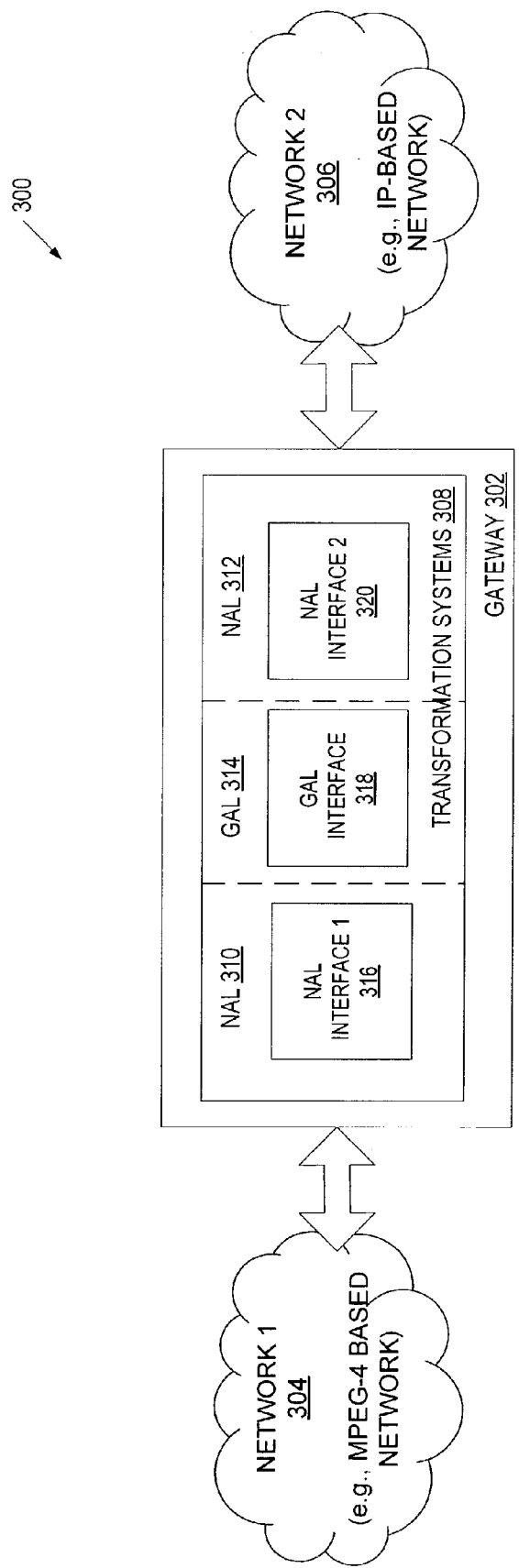
FIG. 3 is a block diagram of one embodiment of a gateway system.

FIG. 3 illustrates one embodiment of a gateway system 300. The gateway system 300 includes a gateway 302 connecting two networks 304 and 306 of different types. For example, the network 306 may be an IP-based network and network 304 may be an MPEG-4-based network. The gateway 302 includes a transformation system 308 that conceptually consists of network adaptation layers 310 and 312 and a generic adaptation layer 314.

At a network adaptation layer 310, a NAL interface 316 receives data from a first network 304 (e.g., an MPEG-4-based network) and repackages it into GAL units as discussed above. At the generic adaptation layer 314, a GAL interface 318 receives the GAL units from the NAL interface 316 and passes them to a NAL interface 320. At a network adaptation layer 312, a NAL interface 320 maps the GAL units to the syntax required by a transport medium of a second network 306 (e.g., an RTP/IP-based network) and sends the resulting content to the second network 306.

Similarly, data received from the second network 306 may be repackaged into GAL units by the NAL interface 320, passed to the GAL interface 318 and mapped to the syntax of the first network by the NAL interface 316.

Figure 4:
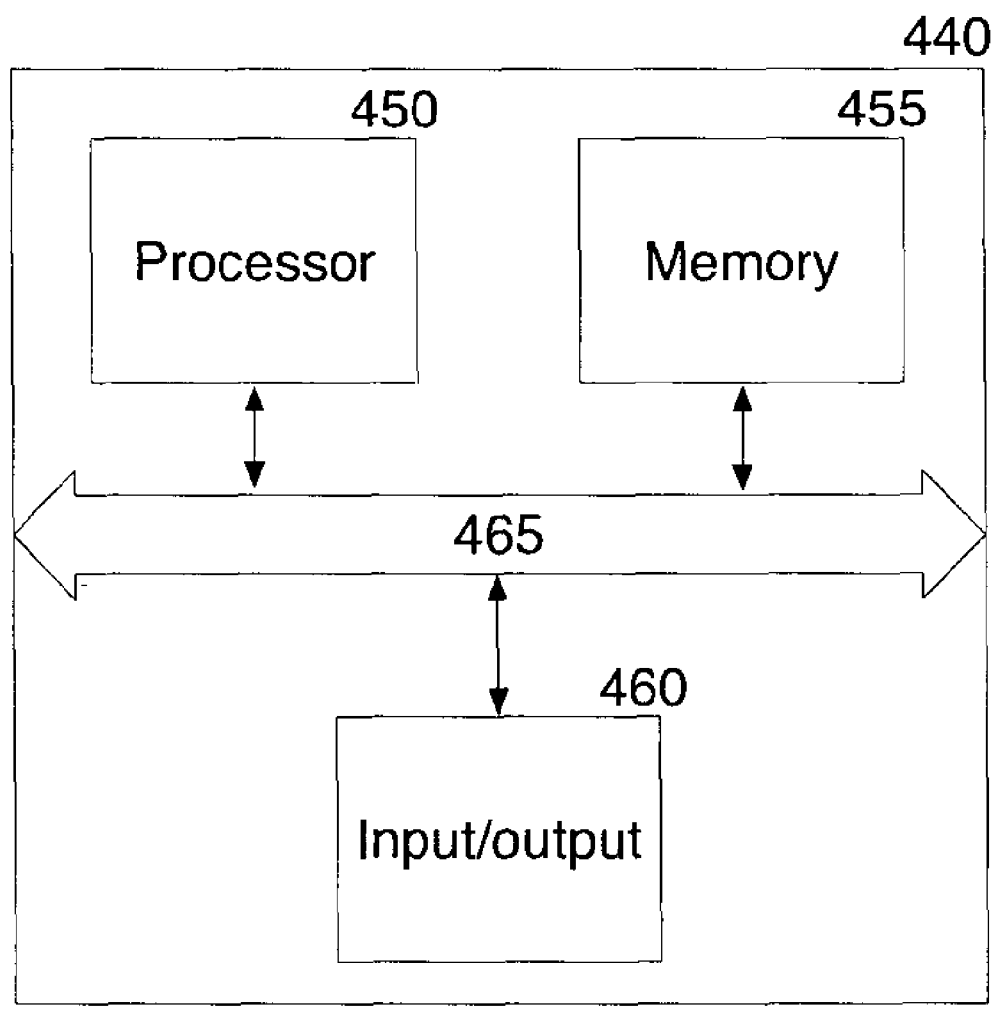
FIG. 4 is a block diagram of a computer environment suitable for practicing the invention.

The following description of FIG. 4 is intended to provide an overview of computer hardware and other operating components suitable for implementing the invention, but is not intended to limit the applicable environments. FIG. 4 illustrates one embodiment of a computer system suitable for use as a GAL interface 106 and/or a NAL interface 108 of FIG. 1, a GAL interface 204 and/or a NAL interface 202 of FIG. 2, or a GAL interface 318 and/or a NAL interface 316 or 320 of FIG. 3.

The computer system 440 includes a processor 450, memory 455 and input/output capability 460 coupled to a system bus 465. The memory 455 is configured to store instructions which, when executed by the processor 450, perform the methods described herein. Input/output 460 also encompasses various types of computer-readable media, including any type of storage device that is accessible by the processor 450. One of skill in the art will immediately recognize that the term "computer-readable medium/media" further encompasses a carrier wave that encodes a data signal. It will also be appreciated that the system 440 is controlled by operating system software executing in memory 455. Input/output and related media 460 store the computer-executable instructions for the operating system and methods of the present invention. Each of the metadata generator 106, the file creator 108, the metadata extractor 204 and the media data stream processor 206 that are shown in FIGS. 1 and 2 may be a separate component coupled to the processor 450, or may be embodied in computer-executable instructions executed by the processor 450. In one embodiment, the computer system 440 may be part of, or coupled to, an ISP (Internet Service Provider) through input/output 460 to transmit or receive media data over the Internet. It is readily apparent that the present invention is not limited to Internet access and Internet web-based sites; directly coupled and private networks are also contemplated.

It will be appreciated that the computer system 440 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

The operation of a generic adaptation layer will now be discussed in more detail. Specifically, a GAL interface creates a set of GAL units using slices received from the VCL. The GAL units include structural units that define the structure of the media data and media data units that include the coded media data from the VCL. In one embodiment, the GAL units also include parameter set units that contain parameter sets associated with the multimedia data. In one embodiment, the GAL units further include SEI message units containing SEI messages associated with the media data.

Figure 5:
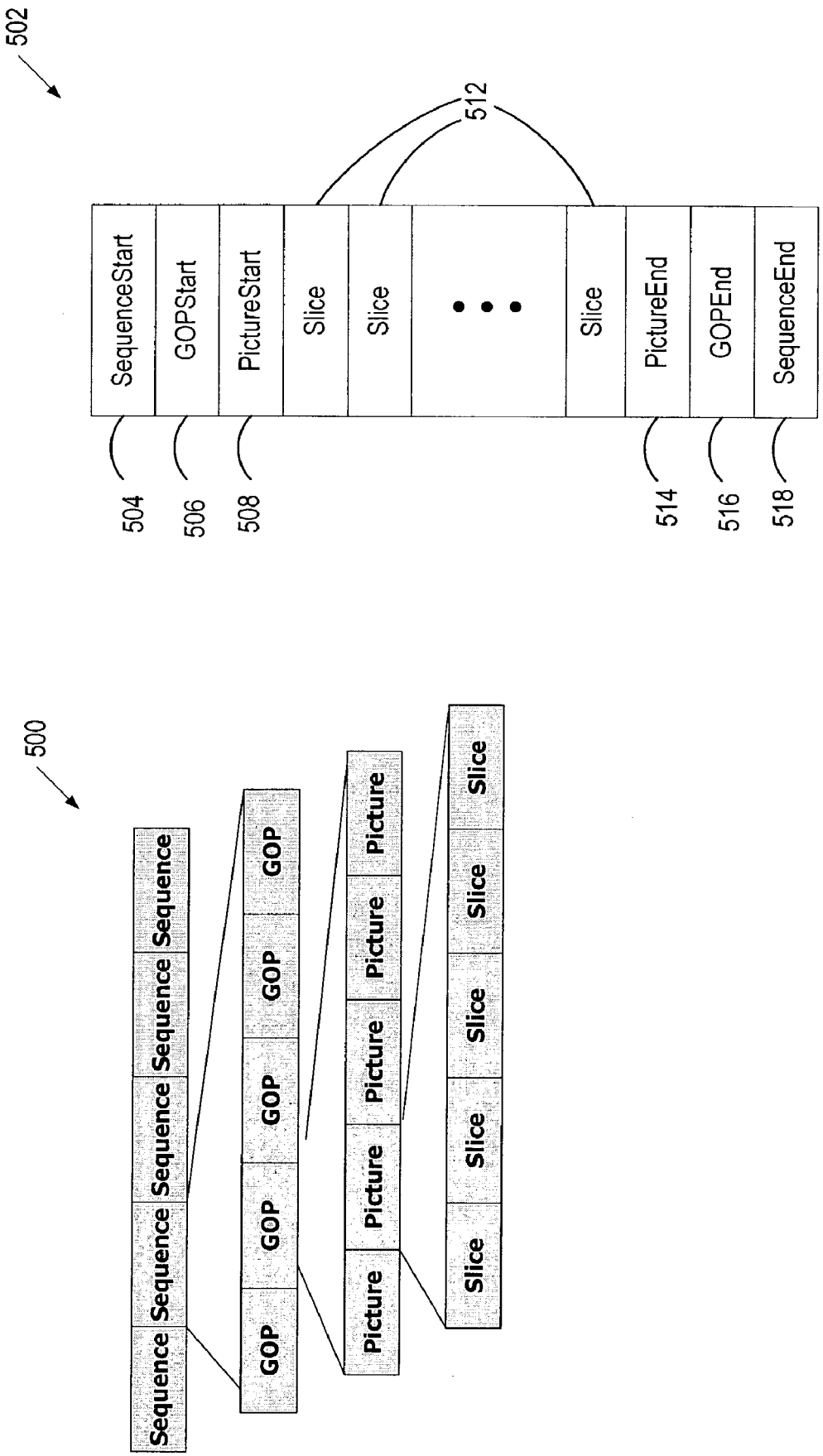
FIG. 5 illustrates one embodiment of a process for creating GAL units at a generic adaptation layer.

FIG. 5 illustrates one embodiment of a process for creating GAL units at the generic adaptation layer.

Referring to FIG. 5, an exemplary model 500 of media data coded by the VCL is illustrated. At the lowest level of model 500 are slices containing the VCL data. At a second level of model 500 are pictures representing image data. Each picture is coded as a series of slices. At a third level of model 500 are groups of pictures (GOPs). Each GOP combines a series of pictures that are independently decodable. At the highest level of model 500 are sequences that contain sequences of GOPs.

The generic adaptation layer creates structural units that define the above structure of the media data. Specifically, structural units specify the start and the end of each layer of model 500. For example, a set of GAL units 502 includes structural units containing a sequence start unit 504 that signals the beginning of a sequence layer, with all data related to this sequence occurring before a corresponding sequence end unit 518, a GOP start unit 506 that signals the beginning of a group of pictures, with all data for the GOP occurring after the unit 506 and before a corresponding GOP end unit 516, and a picture start unit 508 that signals the beginning of a picture, with all data associated with this picture occurring after the unit 508 and before a corresponding picture end unit 514. In one embodiment, end layer units 514 through 518 are optional because the end of one layer can be inferred from the start of another layer (except at the beginning and end of a sequence).

In one embodiment, in which the GAL interface is part of the VCL encoder, the GAL interface receives signals from the VCL that indicate the start and end of each layer of the media data. In another embodiment, in which the GAL interface is an independent module, the GAL interface extracts information about the structure of the media data (e.g., information about the start and end of each layer of the media data) from headers of slices received from the VCL encoder.

In addition, the set 502 includes media data units that contain slices 512. There are two types of media data units: slice units and partitioned slice units. In one embodiment, a slice unit contains a slice consisting of a slice header and video data. The video data contains the VCL data for a set of macroblocks. The VCL data is a sequence of bits representing the syntax element defined by the VCL for the microblocks in the slice.

A partitioned slice unit includes a portion of a slice. That is, the data for a slice, including both header data and payload data, may be partitioned. When partitioned, the set of symbols in the video data and the header data encodings are divided. The data for each partition in a slice consists of all bits whose symbols are in that partition in the order defined by the header or video syntax. For example, if a data partition contains both header and video data, then the order is header bits followed by video data bits. In one embodiment, there are three different partitions that contain header information (including the slice header), intra coefficients, and inter coefficients respectively. A partitioned slice unit is defined for partitioned slice data, with each unit containing a partition identifier followed by the data in the partition.

In one embodiment (not shown), the set 502 also contains parameter set units and SEI message units. A parameter set element defines a set of parameter values that control the decoding of VCL data. In one embodiment, parameters are associated with levels in the media data structure according to the lowest level at which they may vary. For example, a GOP parameter value like picture size may change between GOPs but not at any lower levels. Hence, in one embodiment, all of the pictures and slices in a single GOP use the same GOP parameter value while a slice parameter may vary for every slice. In one embodiment, each parameter set is assigned a unique identifier, which is constant throughout a video sequence, and each slice unit references a corresponding parameter set identifier.

SEI messages contain information pertaining to any of the four layers of the video model: sequence, GOP, picture, and slice. In one embodiment, an SEI message at any level consists of a message type identifier and message data having the format defined by the message type.

Figure 6:
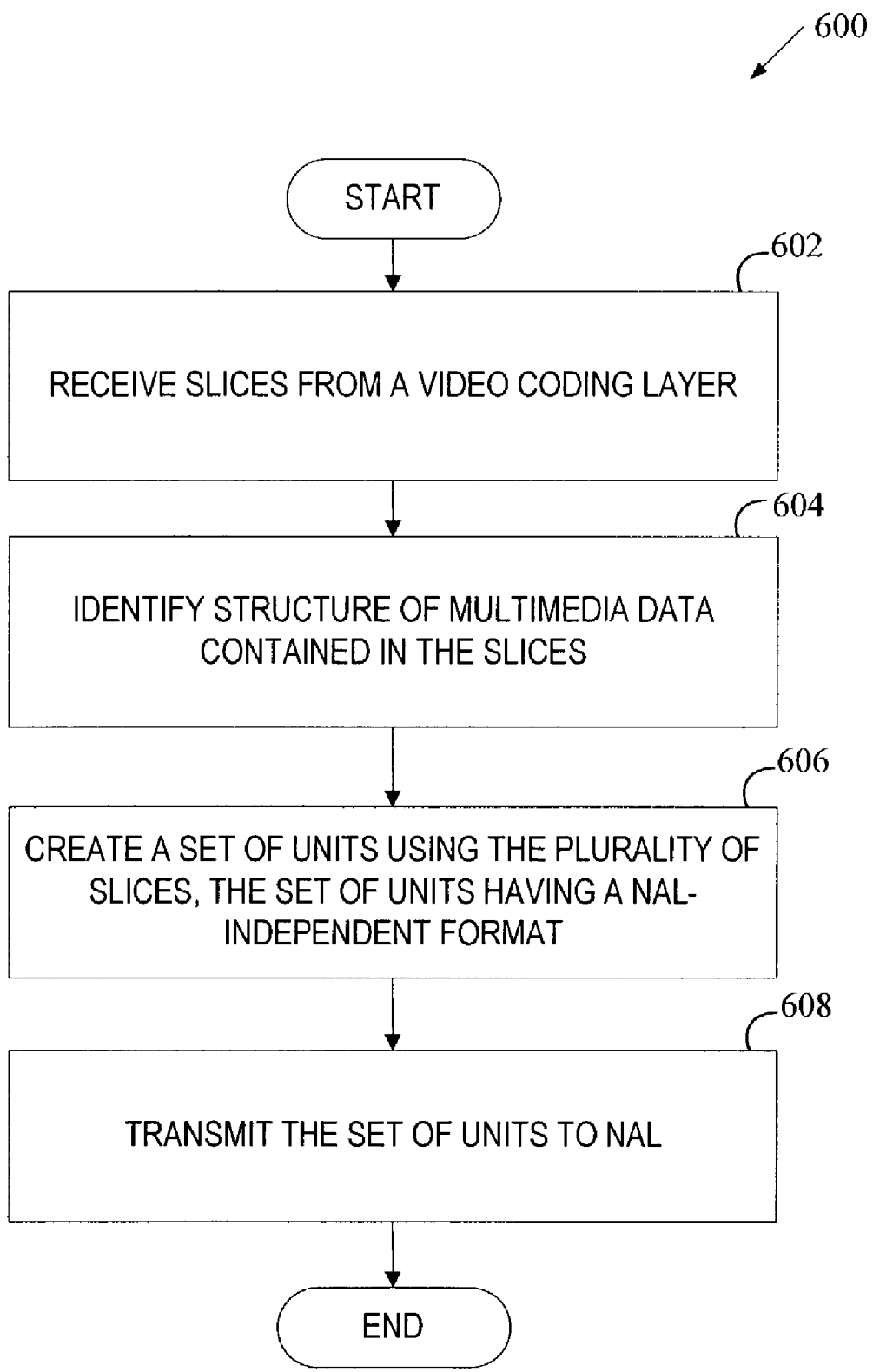
FIG. 6 is a flow diagram of one embodiment a process for providing GAL units to a NAL that is performed by a generic adaptation layer.

FIG. 6 is a flow diagram of one embodiment a process for providing GAL units to a NAL that is performed by a generic adaptation layer. The process may be performed by processing logic that may comprise hardware (e.g., circuitry, dedicated logic, etc.), software (such as run on a general purpose computer system or a dedicated machine), or a combination of both. For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer operations may be incorporated into the process illustrated in FIG. 6 without departing from the scope of the invention and that no particular order is implied by the arrangement of blocks shown and described herein.

Referring to FIG. 6, processing logic begins with receiving slices from a VCL (processing block 602). Next, processing logic identifies the structure of multimedia data contain in the slices (processing block 604). The structure of the multimedia data is defined by multiple hierarchical layers within the multimedia data, such as sequences, GOPs, pictures and slices. In one embodiment, processing logic identifies the structure of the multimedia data based on signals received from the VCL that indicate the start and end of each layer. In another embodiment, processing logic identifies the structure of the multimedia data using information extracted from the headers of the slices received from the VCL encoder.

Further, processing logic creates a set of GAL units using the slices received from the VCL and the information about the structure of the multimedia data (processing block 606). The format of the GAL units is generic to various NAL types (e.g., an IP NAL, a MPEG-2 NAL, a media file format NAL, etc.). In one embodiment, the set of GAL units includes structural units that define the structure of the multimedia data, media data units that include the coded multimedia data, parameter set units that include parameter sets associated with the multimedia data, and SEI message units that include SEI messages associated with the multimedia data.

Afterwards, processing logic transmits the set of GAL units to a NAL of a specific type (processing block 608). In one embodiment, processing logic, prior to transmitting the set of GAL units to the NAL, orders the GAL units according to predefined requirements, as will be discussed in more detail below.

In one embodiment, the GAL units (also referred to herein as carriage units) are sent through a channel, which can be any underlying transport or storage mechanism. The channel may be from NAL to a VCL decoder, from a VCL encoder to NAL, or from NAL to NAL in a gateway. The GAL units may be delivered in band with the media data stream, out of band (when transmitting Parameter Set GAL units), or not delivered at all if the information is known in advance (e.g., in the case of hardwired parameter sets used in encoding the video)

In one embodiment, the syntax for each GAL unit is made of a common header followed by a payload. In one embodiment, the syntax is defined using the Syntactic Description Language, with one class for each generic element. The syntax provides for extensibility by allowing extra information to be included in a GAL unit. Decoders that do not understand the extended syntax are configured to ignore the additional information.

In one embodiment, the header of a GAL unit includes an 8-bit type identifier. Table 1 provides a list of tags defining different type identifiers of GAL units.

TABLE 1

| Tag value | Tag name |
|---|---|
| 0x00 | Illegal value (i.e. start code) |
| 0x10 | GAL_SEQUENCE_START |
| 0x11 | GAL_SEQUENCE_END |
| 0x12 | GAL_GOP_START |
| 0x13 | GAL_GOP_END |
| 0x14 | GAL_PICTURE_START |
| 0x15 | GAL_PICTURE_END |
| 0x16 | GAL_SLICE_START |
| 0x17 | GAL_SLICE_START |
| 0x18 | GAL_SLICE_UNPARTIONED_DATA |
| 0x19 | GAL_SLICE_PARTIONED_DATA |
| 0x1A | GAL_PARAMETER_SET |
| 0x1B | GAL_SEQUENCE_SEI_MESSAGE |
| 0x1C | GAL_GOP_SEI_MESSAGE |
| 0x1D | GAL_PICTURE_SEI_MESSAGE |
| 0x1E | GAL_SLICE_SEI_MESSAGE |

In one embodiment, the syntax of the body for each GAL unit is defined in two stages: first, as a bit-oriented syntax without regard for padding, start emulation or byte alignment, and then as a byte-oriented syntax with start code escapes. The message is further defined as the concatenation of the bits in the message header and message body. In one embodiment, the length of all GAL units is not encoded in the GAL unit syntax. Instead, the length of GAL units is defined by a lower level framing protocol that may use start codes, length fields, or any other suitable fields to do it.

In one embodiment, the set of GAL units transferred to the NAL represents an access unit. According to its MPEG-4 definition, an access unit is an individually accessible portion of data within a stream that is the smallest data entity to which timing information can be attached. In one embodiment, a GAL access unit contains a concatenated sequence of GAL units that share the same timing information. A GAL access unit contains a header specifying the size of each GAL unit as well as the number of GAL units contained in the GAL access unit. Table 2 illustrates an exemplary GAL access unit.

TABLE 2

| Number of GAL Units |
|---|
| GAL Unit Size 1 |
| ... |
| GAL Unit Size m |
| GAL Unit 1 |
| GAL Unit 2 |
| ... |
| GAL Unit m |

In one embodiment, the GAL units sent to the NAL are ordered into a sequence. This order may be a logical ordering of information based on dependencies among the information in the various GAL units. In one embodiment, the ordering of GAL units does not imply any particular delivery schedule for the NAL. Formally, the ordering constraints impose a partial ordering over the GAL units but not a total ordering. The NAL must deliver GAL units such that resulting logical information is reconstructed so that it satisfies the partially ordering of the GAL unit sequence. For example, this implies that a NAL must ensure that parameter sets are available before any slice that references them but allows a NAL to send parameter sets more than once.

In one embodiment, the ordering of GAL units satisfies the following constraints: (1) parameter set messages must occur before they are referenced, (2) SEI messages must occur prior to the beginning of the item to which they pertain, (3) video messages are carried in decoding order, (4) slices within a single picture may be sent in any order (e.g., slices are not required to be sent in "scan order"), and (5) the data partitions in a single slice may be sent in any order.

Figure 7:
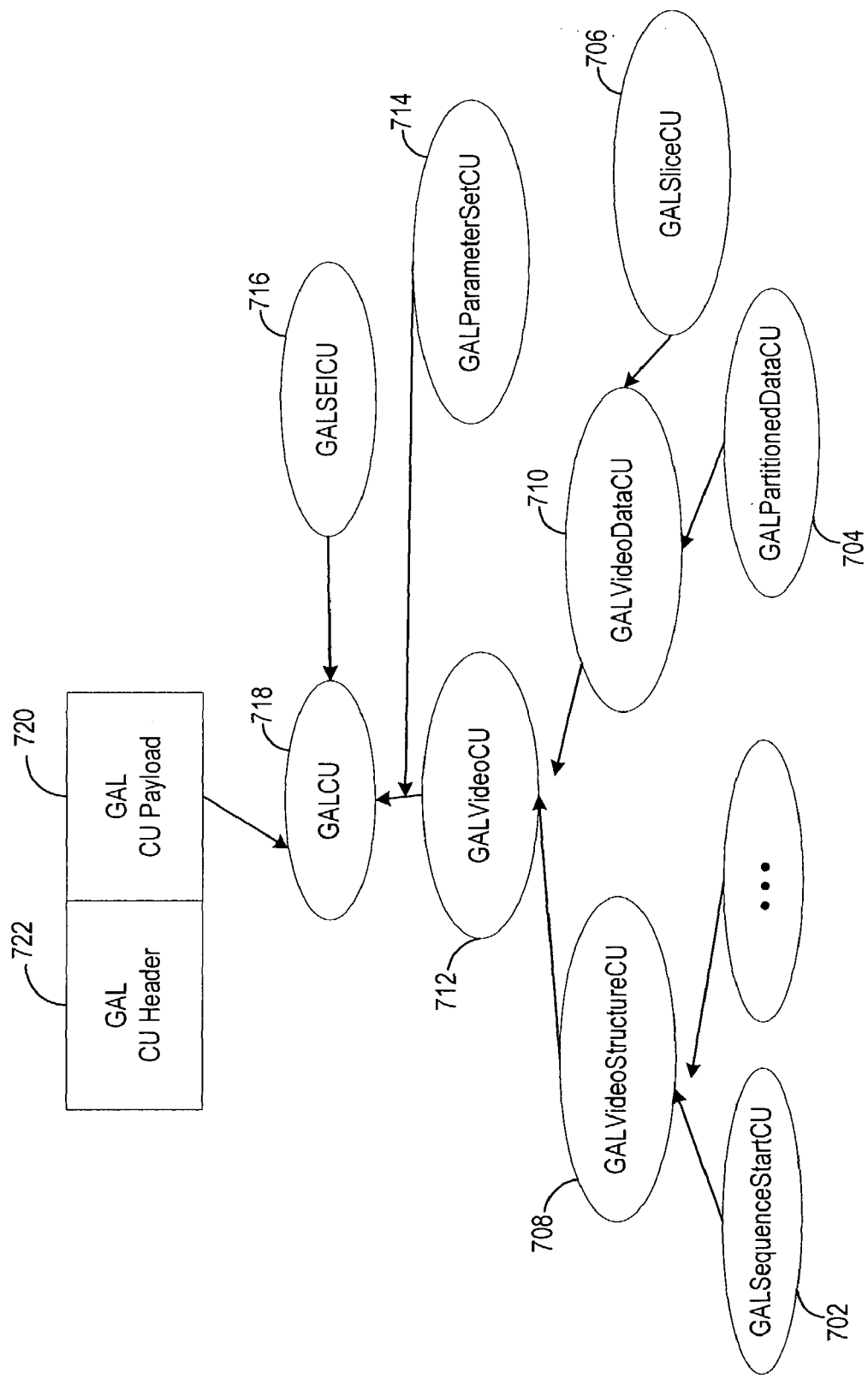
FIG. 7 illustrates a hierarchical structure of a GAL unit for a video.

FIG. 7 illustrates a hierarchical structure of a GAL unit for a video. As discussed above, a GAL unit also referred to herein as a GAL carriage unit (GAL CU) includes a header 722 and a payload 720. In one embodiment, the GAL CU payload 720 is byte-based with start code emulation protection. A GAL CU 718 for the video results from the combination of CUs of different types. Specifically, a GALVideoStructureCU 708 is composed of multiple structural units 702 and a GALVideoDataCU 710 is composed of multiple media data units such as a slice unit 706 and a partitioned data unit 704. Next, the GALVideoStructureCU 708 and the GALVideoDataCU 710 are combined into a GALVideoCU 712. The GALVideoCU 712 is further combined with a GALParameterSetCU 714 and a GALSEICU 716 into the final GALCU 718 associated with the video.

The operation at a network adaptation layer (NAL) will now be discussed in more detail. Each NAL is associated with a specific transport system (e.g., RTP/IP system, MPEG-2 system, MP4 file format system, etc.), and depending on a transport system, a NAL may be a packet-oriented network adaptation layer, a bit-stream network adaptation layer, a storage adaptation layer for storing video content in a file, etc.

Figure 8:
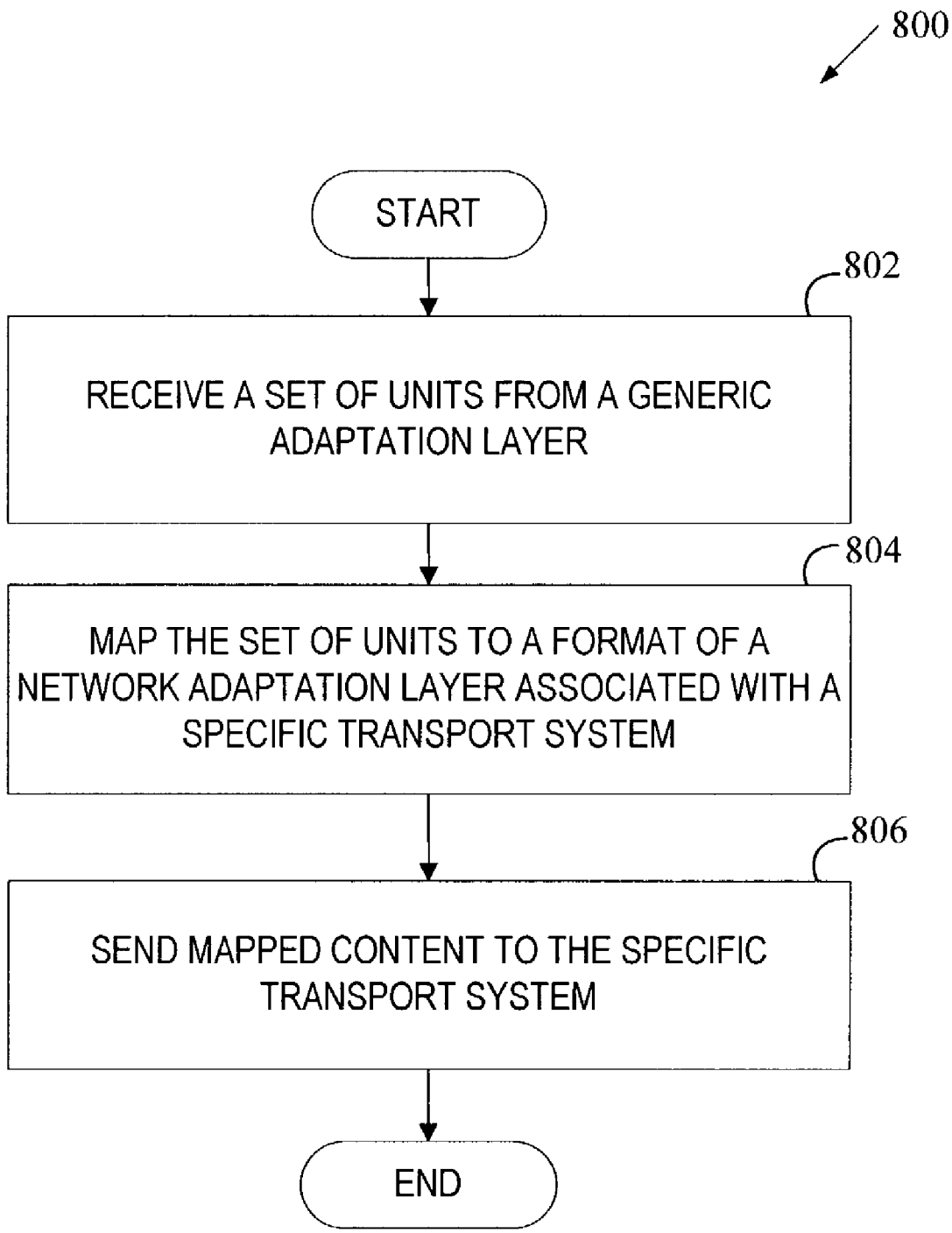
FIG. 8 is a flow diagram of one embodiment of a process for mapping GAL units that is performed by a NAL.

FIG. 8 is a flow diagram of one embodiment of a process for mapping GAL units that is performed by a NAL. The process may be performed by processing logic that may comprise hardware (e.g., circuitry, dedicated logic, etc.), software (such as run on a general purpose computer system or a dedicated machine), or a combination of both. It will be appreciated that more or fewer operations may be incorporated into the process illustrated in FIG. 8 without departing from the scope of the invention and that no particular order is implied by the arrangement of blocks shown and described herein.

Referring to FIG. 8, processing logic begins with receiving a set of GAL units from the GAL (processing block 802). Next, processing logic maps the set of GAL units to a format of a NAL associated with a specific transport system (processing block 804) and sends the mapped content to the specific transport system (processing block 806). In one embodiment, processing logic performs the mapping by identifying logical channels used by this NAL, determining which types of GAL units are carried on each channel, determining the syntax of each channel, and mapping the GAL units to the syntax of the corresponding channels.

As discussed above, each NAL may carry the content over one or more logical channels. For example, a channel might be a systems level stream or an out-of-band signaling protocol. In another example, a logical channel may reflect a previous exchange of information concerning the media data (e.g., hardwired parameter sets with no data being exchanged). In the case of a file format NAL, the "channel" is information stored in the file, including both media data (e.g., VCL data) and metadata (e.g., non-VCL data). In one embodiment, each NAL type is defined by a NAL descriptor that specifies the number of channels used by this NAL type, characteristics of each channel, types of GAL units carried on each channel, and mapping from the generic syntax of GAL units to the syntax of each channel. Table 3 specifies fields of an exemplary NAL descriptor.

TABLE 3

| | |
|---|---|
| Number of Logical Channels | Indicates the number of channels used in this NAL. |
| Logical Channel Descriptors | Defines the characteristics of each logical channel used by the NAL. |

Table 4 illustrates exemplary fields of a logical channel descriptor of Table 3.

TABLE 4

| | |
|---|---|
| Channel Class | Storage, Stream, Null |
| | Indicates the general class of systems layer that the NAL uses to implement this mechanism. The null channel indicates that no information is transmitted. This is used for optional items, like SEI messages which may not be supported by all NALs. |
| GAL Unit Types | Indicates the type of GAL units contained in this logical channel. |
| Priority | Indicates the priority level of the GAL channel. |
| Start Codes | Indicates whether this channel uses start codes. The default start code is "00 00 01" defined by MPEG-2 Systems. |
| Start Code Emulation Avoidance | Indicates whether this channel uses escape codes to prevent emulation of start codes in the channel. This value is set only if the channel uses start codes. |
| Initial Description Information | Static, Dynamic |
| | Indicates whether the channel can transmit information during the lifetime of a session. This is used to indicate whether, for example, a NAL supports carrying parameter set messages statically (set once before playback commences) or dynamically (changing while the video is presented and not necessarily known a priori to the decoder at the session setup). |

Exemplary mappings of GAL units by NALs of various types will now be discussed in more detail.

Beginning with an RTP/IP NAL, in one embodiment, all information may be carried in a single in-band channel as different types of packets encapsulated within RTP packets. The information may include media data, parameter set data, and SEI messages. Table 5 illustrates one embodiment of an adaptation layer descriptor for a RTP/IP NAL.

TABLE 5

| | | |
|---|---|---|
| Number of Channels | 2 | |
| Channel 1 Descriptor | Class | Stream |
| | GAL Types | Video Data Units, Parameter Set Units |
| | Priority | High |
| | Start Codes | No |
| | Start Code Emulation Prevention Carriage | No Dynamic |
| Channel 2 Descriptor | Class | Null |
| | GAL Types | Video Structure Units |
| | Priority | N/A |
| | Start Codes | N/A |
| | Start Code Emulation Prevention Carriage | N/A N/A |

Figure 9:
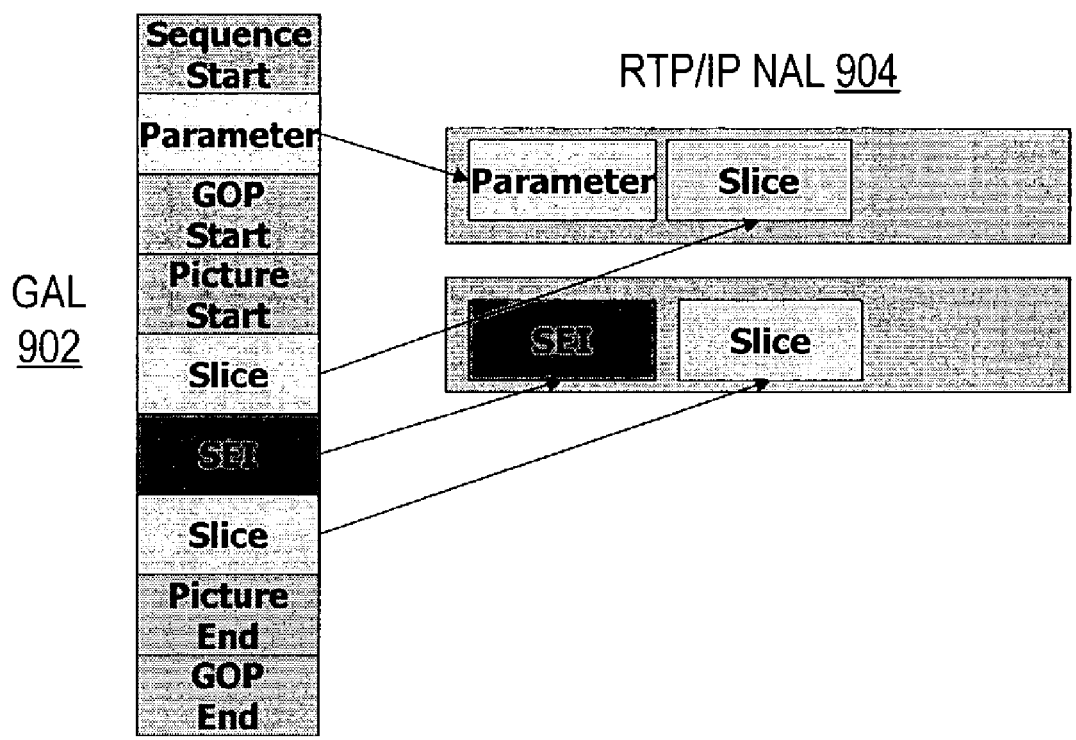
FIG. 9 illustrates one embodiment of the syntactic mapping from GAL syntax to RTP packet syntax.

FIG. 9 illustrates one embodiment of the syntactic mapping from GAL syntax to RTP packet syntax. The syntactic mapping from the syntax of GAL 902 to the syntax of RTP/IP NAL 904 includes encapsulating Video data units or Parameter Set units with no change and appending an RTP header in front of each unit. The RTP/IP NAL does not need to add start codes or provide start code emulation prevention.

In an alternative embodiment, an RTP/IP NAL uses the Session Description Protocol to send parameter set values out-of-band. Table 6 illustrates an adaptation layer descriptor for a RTP/IP NAL, according to an alternative embodiment.

TABLE 6

| | | |
|---|---|---|
| Number of Channels | 2 | |
| Parameter Sets | Open | |
| Channel 1 Descriptor | Class | Stream |
| | GAL Types | Video Data |
| | Priority | High |
| | Start Codes | No |
| | Anti-emulation Carriage | No Dynamic |
| Channel 2 Descriptor | Class | Stream |
| | GAL Types | Parameter Set |
| | Priority | High |
| | Start Codes | No |
| | Start Code | No |
| | Emulation Prevention Carriage | Static |

With respect to the MPEG-2 Systems NAL, in one embodiment, an MPEG-2 access unit is used for carrying video data in a video data stream. The video stream also contains headers (picture header, etc.) to demarcate boundaries between the access unit and the header. The SEI messages and parameter sets are placed separately inside program descriptors. Table 7 illustrates an adaptation layer descriptor for an MPEG-2 NAL, according to one embodiment.

TABLE 7

| | | |
|---|---|---|
| Number of Channels | 2 | |
| Channel 1 Descriptor | Class | Stream |
| | GAL Types | Video Data, Video Structure |
| | Priority | High |
| | Start Codes | Yes |
| | Start Code Emulation Prevention | Yes |
| | Initial Description | Dynamic |
| Channel 2 Descriptor | Class | Stream |
| | GAL Types | Parameter Set |

TABLE 7-continued

|  |  |  |
|---|---|---|
|  |  | SEI Messages |
|  | Priority | High |
|  | Start Codes | No |
|  | Start Code Emulation Prevention | No |
|  | Initial Description | Static |

Figure 10A:
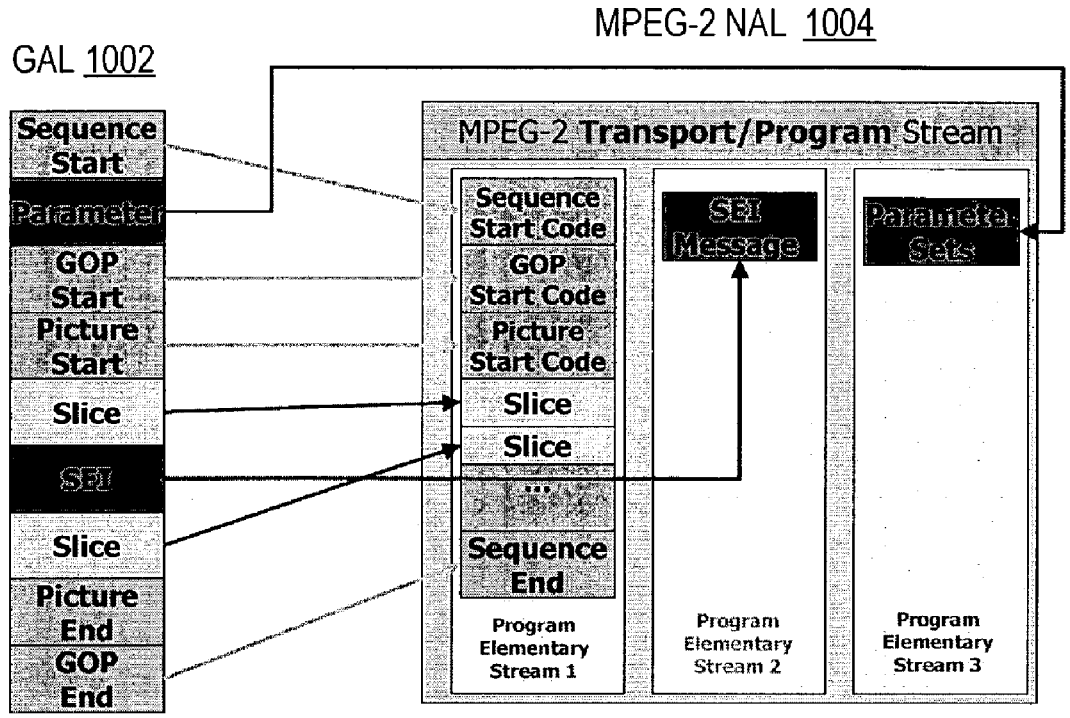
FIGS. 10A and 10B illustrate alternative embodiments of mapping from GAL syntax to MPEG-2 NAL syntax.

FIG. 10A illustrates one embodiment of mapping from GAL 1002 to MPEG-2 NAL 1004. The mapping is performed into multiple program elementary streams (PES), the first PES containing media data information, the second PES containing SEI messages, and the third PES containing parameter sets.

In another embodiment, all data is carried in-band in the video stream channel, including parameter sets and messages. A single packet format, called an AVC packet, is defined that is equivalent to the generic access unit. The AVC packet can be carried over an MPEG-2 program or transport stream. Table 8 illustrates an adaptation layer descriptor for an MPEG-2 NAL, according to a second embodiment.

TABLE 8

| Number of Channels | 1 |  |
|---|---|---|
| Channel 1 Descriptor | Class | Stream |
|  | GAL Types | Video Data, Video Structure Parameter Sets |
|  | Priority | High |
|  | Start Codes | No |
|  | Start Code Emulation Prevention | No |
|  | Carriage | Dynamic |

In yet another embodiment, MPEG-2 NAL uses the MPEG-2 Video syntax for JVT video (sequence headers, GOP headers, etc.) with slices. It uses the MPEG-2 start codes to delimit boundaries in the bit stream. Table 9 illustrates an adaptation layer descriptor for an MPEG-2 NAL, according to a third embodiment.

TABLE 9

| Number of Channels | 1 |  |
|---|---|---|
| Channel 1 Descriptor | Class | Stream |
|  | GAL Types | Video Data, Video Structure, Parameter Sets |
|  | Priority | High |
|  | Start Codes | No |
|  | Start Code Emulation Prevention | No |
|  | Carriage | Dynamic |

Figure 10B:
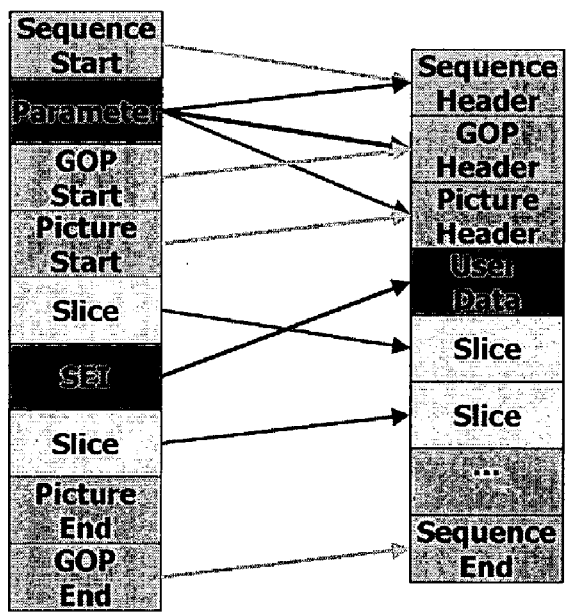

FIG. 10B illustrates an alternative embodiment of mapping from GAL 1010 to MPEG-2 NAL 1012. The mapping is performed into a single program elementary stream (PES). The MPEG-2 user data is used for mapping SEI messages.

With respect to MP4 file format NAL, in one embodiment, the video data is stored as media data in the file format inside the sample structure of an MP4 track, parameter sets are stored as metadata inside separate metadata structures, and SEI message may be stored in a separate track from the video data or interleaved within the same stream. Table 10 illustrates an adaptation layer descriptor for an MP4 file format NAL, according to one embodiment.

TABLE 10

| Number of Channels | 2 |  |
|---|---|---|
| Channel 1 Descriptor | Class | Stream |
|  | GAL Types | Video Data, Video Structure |
|  | Priority | N/A |
|  | Start Codes | Yes |
|  | Anti-emulation | Yes |
|  | Carriage | Dynamic |
| Channel 2 Descriptor | Class | Stream |
|  | GAL Types | Parameter Set, SEI Messages |
|  | Priority | N/A |
|  | Start Codes | No |
|  | Anti-emulation | No |
|  | Carriage | N/A |

Figure 11:
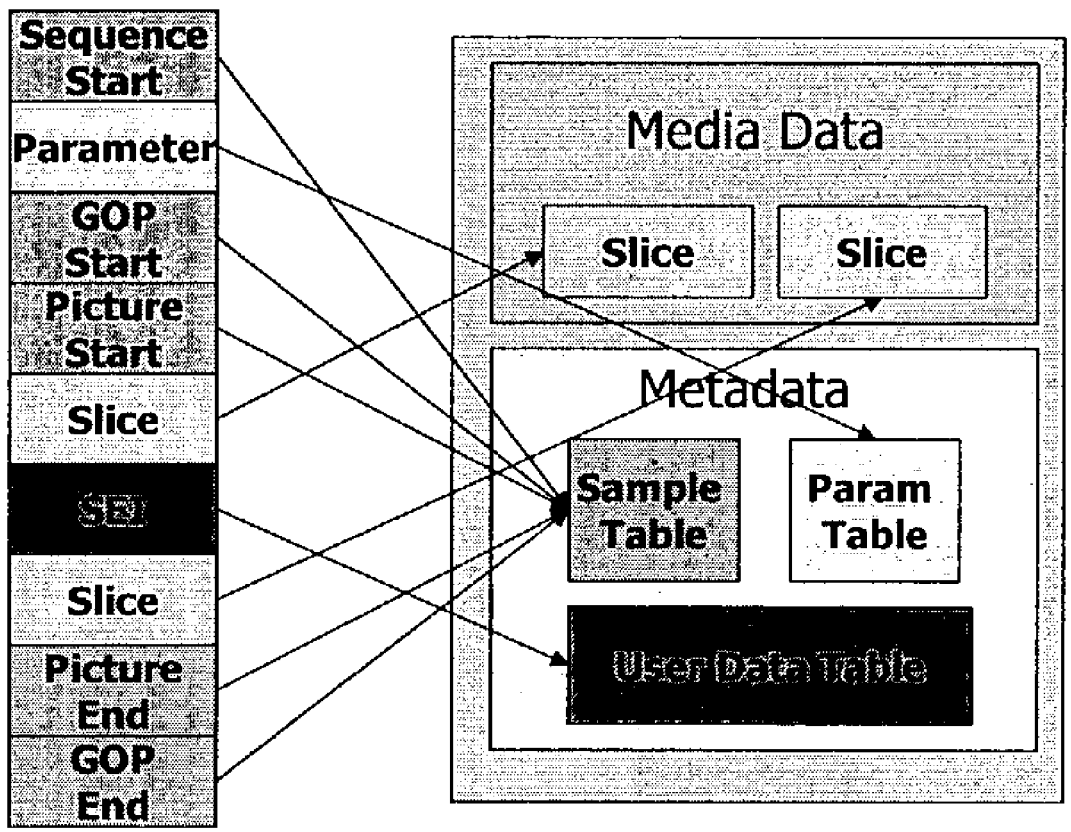
FIG. 11 illustrates one embodiment of mapping from GAL syntax to MP4 file format.

FIG. 11 illustrates one embodiment of mapping from GAL 1102 to MP4 file format NAL 1104.

The operation of a generic adaptation layer and a network adaptation layer has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. An encoding system comprising:
    a video coding layer (VCL) to generate a plurality of slices when encoding multimedia data;
    a generic adaptation layer (GAL) to create a set of GAL units using the plurality of slices, the set of GAL units having a format that is generic to a plurality of transport systems; and
    a network adaptation layer (NAL) associated with one of the plurality of transport systems to map the set of GAL units to a format of said one of the plurality of transport systems.

2. The system of claim 1 wherein the GAL is further to identify structure of the multimedia data.

3. The system of claim 2 wherein the set of GAL units comprises a plurality of structural units providing information about the structure of the multimedia data, one or more multimedia data units including the multimedia data, and one or more parameter set units including the parameter sets associated with the multimedia data.

4. The system of claim 3 wherein the set of GAL units further comprises one or more supplemental enhancement information (SEI) message units including SEI messages associated with the multimedia data.

5. The system of claim 2 wherein the GAL is to identify the structure of the multimedia data based on VCL signals pertaining to the structure of the multimedia data.

6. The system of claim 2 wherein the GAL is to identify the structure of the multimedia data by extracting data from headers of the plurality of slices.

7. The system of claim 1 wherein the set of GAL units includes a concatenated sequence of units sharing the same timing information.

8. The system of claim 1 wherein the GAL is further to order the units within the set.

9. The system of claim 1 wherein the format of said one of the plurality of transport systems is defined by a descriptor of the NAL associated with the specific transport system.

10. The system of claim 9 wherein the descriptor specifies a number of NAL channels used to carry the set of units and defines characteristics of each of the NAL channels.

11. The system of claim 10 wherein the NAL is to map the set of GAL units by determining, for each GAL unit within the set, which of the channels is designated to carry said each GAL unit based on a unit type of said each GAL unit, and formatting the set of GAL units according to predefined syntax of corresponding channels.

12. The system of claim 1 wherein the NAL associated with of one of the plurality of transport systems is any one of an IP NAL, an MPEG-2 NAL, and a media file format NAL.

13. A computerized method comprising:
receiving a plurality of slices associated with multimedia data from a video coding layer (VCL);
creating, by an encoding system, a set of units using the plurality of slices, the set of units having a format that is generic to a plurality of network adaptation layer (NAL) types; and
transmitting the set of units to a NAL of one of the plurality of NAL types for transport to a decoding system by a transport system associated with the NAL.

14. The method of claim 13 further comprising:
identifying structure of multimedia data contained in the plurality of slices.

15. The method of claim 14 wherein the set of units comprises a plurality of structural units providing information about the structure of the multimedia data, one or more multimedia data units including the multimedia data, and one or more parameter set units including parameter sets associated with the multimedia data.

16. The method of claim 15 wherein the set of units further comprises one or more supplemental enhancement information (SEI) message units including SEI messages associated with the multimedia data.

17. The method of claim 15 wherein the plurality of structural units are selected from the group consisting of a sequence start unit, a sequence end unit, a group-of-pictures (GOP) start unit, a GOP end unit, a picture start unit, a picture end unit, a slice begin unit, and a slice end unit.

18. The method of claim 15 wherein the one or more multimedia data units are selected from the group consisting of a slice unit and a partitioned sliced unit.

19. The method of claim 14 wherein identifying structure of the multimedia data comprises receiving signals pertaining to the structure of the multimedia data from the VCL.

20. The method of claim 14 wherein identifying structure of the multimedia data comprises extracting data from headers of the plurality of slices.

21. The method of claim 13 wherein the set of units includes a concatenated sequence of units sharing the same timing information.

22. The method of claim 13 further comprising ordering the units within the set according to one or more predefined requirements.

23. A method comprising:
receiving a set of units from a generic adaptation layer (GAL); and
mapping the set of units to a format of a specific network adaptation layer (NAL) type for transport to a decoding system by a transport system associated with the NAL type.

24. The method of claim 23 wherein the set of units is selected from the group consisting of a plurality of structural units, one or more multimedia data units, one or more parameter set units, and one or more supplemental enhancement information (SEI) message units.

25. The method of claim 24 wherein the plurality of structural units provides information about structure of multimedia data.

26. The method of claim 23 wherein the format of the specific transport system is defined by a descriptor of a network adaptation layer (NAL).

27. The method of claim 26 wherein the descriptor specifies a number of channels used to carry the set of units and defines characteristics of each of the channels.

28. The method of claim 27 wherein mapping the set of units comprises:
determining, for each unit within the set, which of the channels is designated to carry said each unit based on a unit type of said each unit; and
formatting the set of units according to predefined syntax of corresponding channels.

29. The method of claim 27 wherein the specific NAL type is any one of an IP NAL, an MPEG-2 NAL, and a media file format NAL.

30. An apparatus comprising:
means for receiving a plurality of slices associated with multimedia data from a video coding layer (VCL);
means for creating a set of units using the plurality of slices, the set of units having a format that is generic to a plurality of network adaptation layer (NAL) types; and
means for transmitting the set of units to a NAL of one of the plurality of NAL types.

31. An apparatus comprising:
means for receiving a set of units from a generic adaptation layer (GAL); and
means for mapping the set of units to a format of a specific network adaptation layer (NAL) type.

32. A system comprising:
a memory; and
at least one processor coupled to the memory, the at least one processor executing a set of instructions which cause the at least one processor to
receive a plurality of slices associated with multimedia data from a video coding layer (VCL);
create a set of units using the plurality of slices, the set of units having a format that is generic to a plurality of network adaptation layer (NAL) types; and
transmit the set of units to a NAL of one of the plurality of NAL types.

33. A system comprising:
a memory; and
at least one processor coupled to the memory, the at least one processor executing a set of instructions which cause the at least one processor to
receive a set of units from a generic adaptation layer (GAL); and
map the set of units to a format of a specific network adaptation layer (NAL) type.

34. A non-transitory computer readable medium that provides instructions, which when executed on a processor cause the processor to perform a method comprising:
receiving a plurality of slices associated with multimedia data from a video coding layer (VCL);
creating, by an encoding system, a set of units using the plurality of slices, the set of units having a format that is generic to a plurality of network adaptation layer (NAL) types; and transmitting the set of units to a NAL of one of the plurality of NAL types for transport to a decoding system by a transport system associated with the NAL.

35. A non-transitory computer readable storage medium that provides instructions, which when executed on a processor cause the processor to perform a method comprising:
receiving a set of units from a generic adaptation layer (GAL); and
mapping, by an encoding system, the set of units to a format of a specific network adaptation layer (NAL) type for transport to a decoding system by a transport system associated with the NAL type.

\* \* \* \* \*